(12) United States Patent
Taherzadeh Boroujeni et al.

(10) Patent No.: US 11,910,333 B2
(45) Date of Patent: Feb. 20, 2024

(54) MPE-AWARE TRANSMISSION SCHEDULING

(71) Applicant: QUALCOMM Incorporated, San Diego, CA (US)

(72) Inventors: Mahmoud Taherzadeh Boroujeni, San Diego, CA (US); Tao Luo, San Diego, CA (US); Peter Gaal, San Diego, CA (US); Juan Montojo, San Diego, CA (US); Jelena Damnjanovic, Del Mar, CA (US); Iyab Issam Sakhnini, San Diego, CA (US); Wooseok Nam, San Diego, CA (US); Yan Zhou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 90 days.

(21) Appl. No.: 17/192,730

(22) Filed: Mar. 4, 2021

(65) Prior Publication Data
US 2021/0282093 A1    Sep. 9, 2021

Related U.S. Application Data

(60) Provisional application No. 62/986,516, filed on Mar. 6, 2020.

(51) Int. Cl.
*H04W 52/36* (2009.01)
*H04W 72/044* (2023.01)

(52) U.S. Cl.
CPC ....... *H04W 52/365* (2013.01); *H04W 72/044* (2013.01)

(58) Field of Classification Search
None
See application file for complete search history.

(56) References Cited

U.S. PATENT DOCUMENTS

| | | | |
|---|---|---|---|
| 2018/0167897 A1* | 6/2018 | Sampath | H04W 52/365 |
| 2018/0278318 A1* | 9/2018 | Chakraborty | H04W 52/146 |
| 2020/0021421 A1* | 1/2020 | Han | H04L 5/14 |
| 2020/0145927 A1* | 5/2020 | Sun | H04W 76/27 |
| 2020/0196255 A1* | 6/2020 | Cheng | H04W 72/10 |
| 2020/0383067 A1* | 12/2020 | Liu | H04L 5/0053 |
| 2021/0051630 A1* | 2/2021 | Chae | H04W 72/0453 |
| 2021/0258887 A1* | 8/2021 | Osawa | H04W 52/242 |
| 2022/0116891 A1* | 4/2022 | Yao | H04W 52/367 |
| 2022/0225247 A1* | 7/2022 | Huang | H04W 52/365 |
| 2022/0256473 A1* | 8/2022 | Kiilerich Pratas | H04W 52/283 |

(Continued)

OTHER PUBLICATIONS

International Search Report and Written Opinion—PCT/US2021/021112—ISA/EPO—dated Jun. 11, 2021.

(Continued)

*Primary Examiner* — Kodzovi Acolatse
(74) *Attorney, Agent, or Firm* — Harrity & Harrity, LLP (57) ABSTRACT

Various aspects of the present disclosure generally relate to wireless communication. In some aspects, a user equipment may transmit maximum permissible exposure related information that indicates at least one of: a transmit power limit corresponding to a specified time interval, an average transmit power limit corresponding to the specified time interval, or a combination thereof; and receive an allocation of transmission resources. Numerous other aspects are provided.

30 Claims, 7 Drawing Sheets

(56) References Cited

U.S. PATENT DOCUMENTS

2022/0280351 A1* 9/2022 Weidman ............... A61G 7/00
2022/0295422 A1* 9/2022 Wang ................ H04W 52/367
2022/0377681 A1* 11/2022 Comsa ................. H04B 17/24

OTHER PUBLICATIONS

Nokia, et al., "UE FR2 MPE Enhancements and Solutions", 3GPP Draft, R4-2001382, 3GPP RAN WG4 Meeting #94-e, 3rd Generation Partnership Project (3GPP), Mobile Competence Centre, 650, Route Des Lucioles, F-06921 Sophia-Antipolis Cedex, France, vol. RAN WG4, No. Online, Feb. 24-Mar. 6, 2020, Feb. 14, 2020 (Feb. 14, 2020), XP051851300, 5 Pages, Retrieved from the Internet: URL:https://ftp.3gpp.org/tsg_ran/WG4_Radio/TSGR4_94_e/Docs/R4-2081382.zip R4-2001382 FR2 UE PE Enhancements.doc [retrieved on Feb. 14, 2020] the Whole Document.

VIVO: "Discussion on FR2 MPE mitigation", 3GPP Draft, R4-2000124, 3GPP TSG-RAN WG4 Meeting #94-e, 3rd Generation Partnership Project (3GPP), Mobile Competence Centre, 650, Route Des Lucioles, F-06921 Sophia-Antipolis Cedex, France, vol. RAN WG4, No. Electronic Meeting, Feb. 24-Mar. 6, 2020, Feb. 14, 2020 (Feb. 14, 2020), XP051850223, pp. 1-6, Retrieved from the Internet: URL:https://ftp.3gpp.org/tsg_ran/WG4_Radio/TSGR4_94_e/Docs/R4-2000124.zip R4 -2000124.docx [retrieved on Feb. 14, 2020] the Whole Document.

* cited by examiner

MPE-AWARE TRANSMISSION SCHEDULING

CROSS-REFERENCE TO RELATED APPLICATION

This Patent application claims priority to Provisional Patent Application No. 62/986,516, filed on Mar. 6, 2020, entitled "MPE-AWARE TRANSMISSION SCHEDULING," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for maximum permissible exposure aware transmission scheduling.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies.

SUMMARY

In some aspects, a method of wireless communication, performed by a user equipment (UE), may include transmitting maximum permissible exposure related (MPE-related) information that indicates at least one of: a transmit power limit corresponding to a specified time interval, an average transmit power limit corresponding to the specified time interval, or a combination thereof; and receiving an allocation of transmission resources.

In some aspects, a method of wireless communication, performed by a base station (BS), may include receiving MPE-related information that indicates at least one of: a transmit power limit corresponding to a specified time interval, an average transmit power limit corresponding to the specified time interval, or a combination thereof; and transmitting an allocation of transmission resources.

In some aspects, a UE for wireless communication may include a memory and one or more processors operatively coupled to the memory. The memory and the one or more processors may be configured to transmit MPE-related information that indicates at least one of: a transmit power limit corresponding to a specified time interval, an average transmit power limit corresponding to the specified time interval, or a combination thereof; and receive an allocation of transmission resources.

In some aspects, a BS for wireless communication may include a memory and one or more processors operatively coupled to the memory. The memory and the one or more processors may be configured to receive MPE-related information that indicates at least one of: a transmit power limit corresponding to a specified time interval, an average transmit power limit corresponding to the specified time interval, or a combination thereof; and transmit an allocation of transmission resources.

In some aspects, a non-transitory computer-readable medium may store one or more instructions for wireless communication. The one or more instructions, when executed by one or more processors of a UE, may cause the one or more processors to transmit MPE-related information that indicates at least one of: a transmit power limit corresponding to a specified time interval, an average transmit power limit corresponding to the specified time interval, or a combination thereof; and receive an allocation of transmission resources.

In some aspects, a non-transitory computer-readable medium may store one or more instructions for wireless communication. The one or more instructions, when executed by one or more processors of a BS, may cause the one or more processors to receive MPE-related information that indicates at least one of: a transmit power limit corresponding to a specified time interval, an average transmit power limit corresponding to the specified time interval, or a combination thereof; and transmit an allocation of transmission resources.

In some aspects, an apparatus for wireless communication may include means for transmitting MPE-related information that indicates at least one of: a transmit power limit corresponding to a specified time interval, an average transmit power limit corresponding to the specified time interval, or a combination thereof; and means for receiving an allocation of transmission resources.

In some aspects, an apparatus for wireless communication may include means for receiving MPE-related information that indicates at least one of: a transmit power limit corresponding to a specified time interval, an average transmit power limit corresponding to the specified time interval, or a combination thereof; and means for transmitting an allocation of transmission resources.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
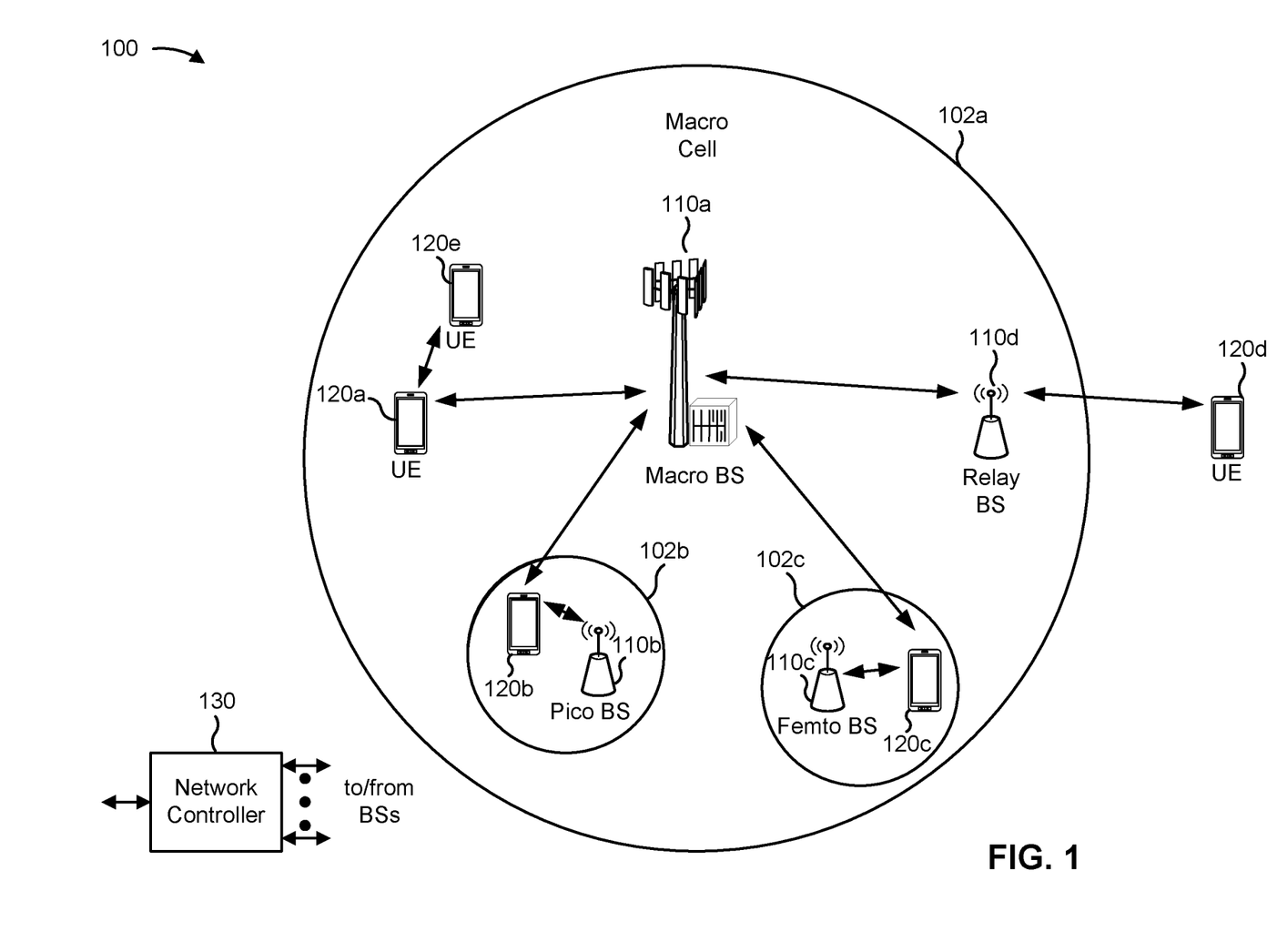
FIG. 1 is a diagram illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
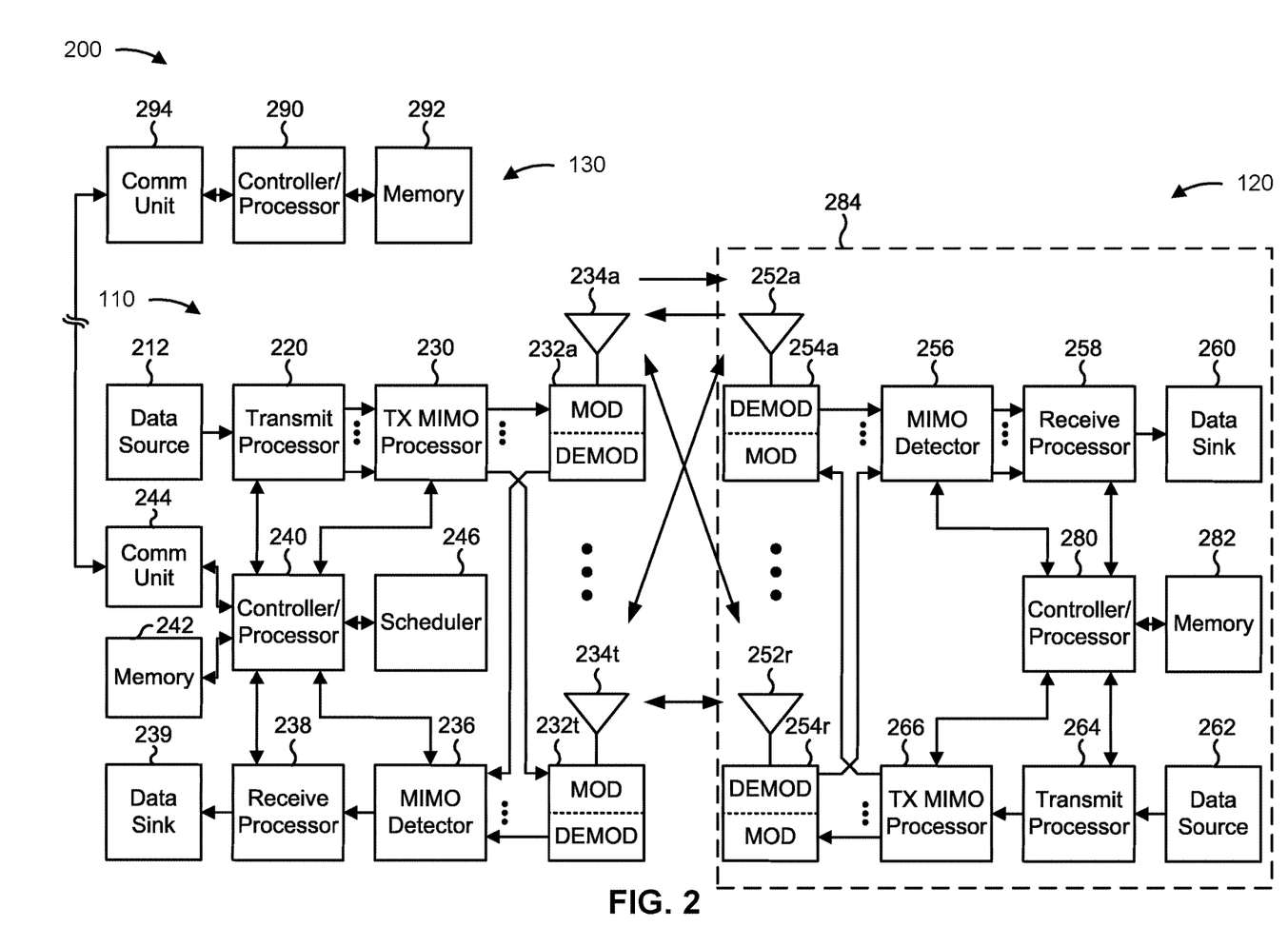
FIG. 2 is a diagram illustrating an example of a base station in communication with a UE in a wireless communication network, in accordance with various aspects of the present disclosure.

FIG. 2 is a diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing 284.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with maximum permissible exposure (MPE) aware transmission scheduling, as described in more detail elsewhere herein. For example, controller/processor 240 of base station 110, controller/processor 280 of UE 120, and/or any other component(s) of FIG. 2 may perform or direct operations of, for example, process 400 of FIG. 4, process 500 of FIG. 5, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 400 of FIG. 4, process 500 of FIG. 5, and/or other processes as described herein. A scheduler 246 may schedule UEs for data transmission on the downlink and/or uplink.

In some aspects, UE 120 may include means for transmitting MPE-related information that indicates at least one of: an MPE condition associated with the UE, a transmit power limit corresponding to a specified time interval, an average transmit power limit corresponding to the specified time interval, or a combination thereof, means for receiving an allocation of transmission resources, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for receiving MPE-related information that indicates at least one of: an MPE condition associated with a UE, a transmit power limit corresponding to a specified time interval, an average transmit power limit corresponding to the specified time interval, or a combination thereof, means for transmitting an allocation of transmission resources, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Because UEs may emit radio frequency (RF) waves, microwaves, and/or other radiation, UEs are generally subject to regulatory RF safety requirements that set forth specific guidelines, or MPE limits, that constrain various operations that the UEs can perform. For example, RF emissions may generally increase when a UE is transmitting, and the RF emissions may further increase in cases where the UE is performing frequent transmissions, high-power transmissions, and/or the like. Accordingly, because frequent and/or high-power transmission may lead to significant RF emissions, regulatory agencies (e.g., the Federal Communications Commission (FCC) in the United States) may provide information related to acceptable RF radiation exposure when UEs are communicating using different radio access technologies.

For example, when a UE is communicating using radio access technologies that operate in a frequency range below 6 GHz, the applicable RF exposure parameter is a specific absorption rate (SAR), which refers to a rate at which the human body absorbs energy when exposed to RF energy (e.g., power absorbed per unit of mass, which may be expressed according to watts per kilogram (W/kg)). In particular, SAR requirements generally specify that overall radiated power by a UE is to remain under a certain level to limit heating that may occur when RF energy is absorbed. In another example, when a UE is communicating using a radio access technology that operates in a high frequency range, such as a millimeter wave (mmW) frequency range, the applicable RF exposure parameter is power density, which may be regulated to limit heating of the UE and/or nearby surfaces.

Accordingly, UEs generally have to satisfy MPE limits, which are typically regulatory requirements that are defined in terms of aggregate exposure over a certain amount of time, and the aggregate exposure may be averaged over a moving integration window (or moving time window). For example, a UE may be subject to an average power limit (Pima) that corresponds to an average power at which an MPE limit is satisfied if the UE were to transmit substantially continuously over a moving integration window of N seconds (e.g., 100 seconds). In some cases, the UE can use an instantaneous transmit power that exceeds the average power limit for a period of time provided that the average power over the moving integration window is under the average power limit at which the MPE limit is satisfied. For example, the UE may transmit at a maximum transmit power at the start of the moving integration window and then reduce the instantaneous transmit power until the moving integration window ends in order to ensure that the MPE limit on aggregate exposure is satisfied over the entire moving integration window. In some cases, the UE may reduce the instantaneous transmit power to a reserve power level (Preserve), which is a minimum transmit power level needed to maintain a link with a base station.

Furthermore, because a base station in communication with the UE may be unaware of how much remaining energy budget is available to the UE within the moving integration window, the base station cannot take appropriate action to adapt scheduling to help the UE maintain the uplink connection.

Some aspects described herein relate to techniques and apparatuses to provide a report that includes MPE-related information to a base station or another UE (in the case of sidelink communications). Accordingly, the base station or the other UE may use the information contained in the report to dynamically adapt scheduling for the UE to help the UE maintain the uplink connection, satisfy MPE limits, and/or the like. For example, in some aspects, the base station may schedule the UE to transmit less often, modify uplink grants to reduce uplink transmit power (e.g., by scheduling a narrower uplink bandwidth or a lower modulation order), and/or the like if the MPE-related information indicates that the UE has a low energy budget.

In this way, by providing a UE report to the base station or the other UE that indicates limits to the uplink energy budget available to the UE, the base station may schedule the UE more efficiently, which improves performance, conserves network resources that may otherwise be used reestablishing a connection that was dropped because the UE reduced the uplink transmit power more than necessary, and/or the like. In some aspects, the base station or the other UE may provide a configuration to the UE, which may include a parameter configuration specifying the MPE-related information so that the base station or the other UE may be able to interpret the MPE-related information using as little signaling overhead as possible. In some aspects, the configuration may include trigger information indicating a trigger for transmitting the MPE-related information, which may facilitate limiting the transmission of MPE-related information to certain times, based on certain events, and/or the like.

Figure 3:
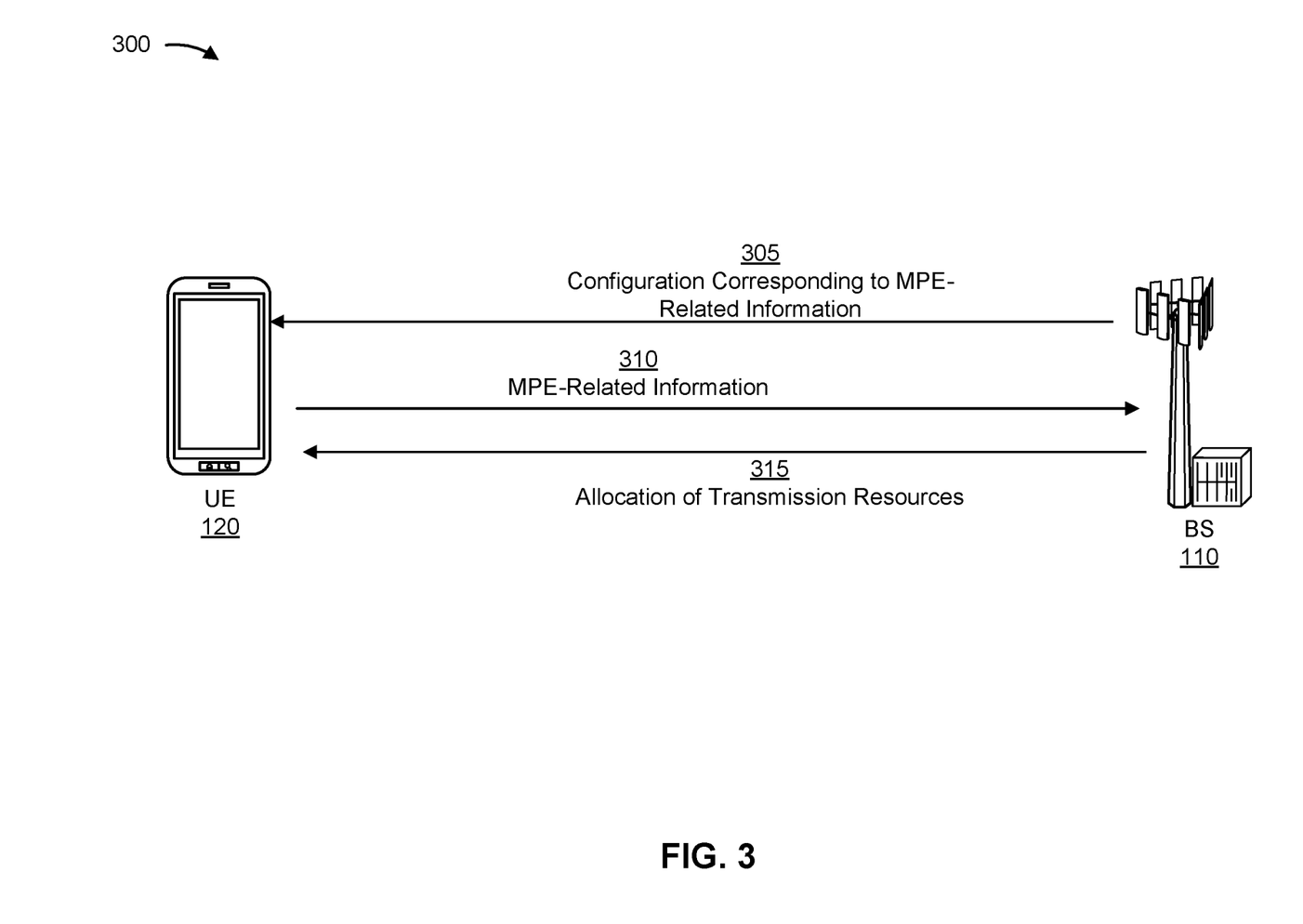
FIG. 3 is a diagram illustrating an example of maximum permissible exposure aware scheduling, in accordance with various aspects of the present disclosure.

FIG. 3 is a diagram illustrating an example 300 of MPE-aware scheduling, in accordance with various aspects of the present disclosure. As shown in FIG. 3, a UE 120 may communicate with a base station 110.

As shown by reference 305, the base station 110 may transmit, and the UE 120 may receive, a configuration corresponding to the MPE-related information. In some aspects, the configuration may be carried in a radio resource control (RRC) message, downlink control information (DCI), and/or the like. The configuration may include a parameter configuration specifying the MPE-related information, a resource allocation for transmitting the MPE-related information, trigger information associated with transmitting the MPE-related information, and/or the like.

In some aspects, the trigger information may indicate a trigger for transmitting the MPE-related information. The trigger may include a dynamic signaling message from a base station, a specified event detected by the UE, and/or the like. In some aspects, the specified event may include an indication from a UE component that an MPE condition has been activated, an indication from a sensor that the UE is within a specified distance of a user, and/or the like.

As shown by reference number 310, the UE 120 may transmit, and the base station 110 may receive, MPE-related information. As shown, the MPE-related information may indicate an MPE condition associated with the UE 120, a transmit power limit corresponding to a specified time interval, an average transmit power limit corresponding to the specified time interval, and/or the like. In some aspects, the MPE-related information may be transmitted using a medium access control (MAC) control element (CE) (MAC-CE), a physical uplink control channel (PUCCH), uplink control information (UCI) on a physical uplink shared channel (PUSCH), a power headroom report (PHR), and/or the like.

As shown by reference number 315, the base station 110 may transmit, and the UE 120 may receive, an allocation of transmission resources. In some aspects, the allocation of transmission resources may be based at least in part on the MPE-related information. In some aspects, the allocation of transmission resources may indicate a set of transmission parameters, a transmit power corresponding to a transmit time interval, a duration of the transmit time interval, and/or the like. In some aspects, the set of transmission parameters may indicate a modulation and coding scheme (MCS), a set of time resources, a set of frequency resources, and/or the like.

In some aspects, as shown, the MPE-related information may be transmitted to base station 110. In some aspects, the MPE-related information may be transmitted to another UE 120. In some such aspects, the allocation of transmission resources may be received from the other UE 120 and may include an allocation of sidelink resources.

As indicated above, FIG. 3 is provided as an example. Other examples may differ from what is described with respect to FIG. 3.

Figure 4:
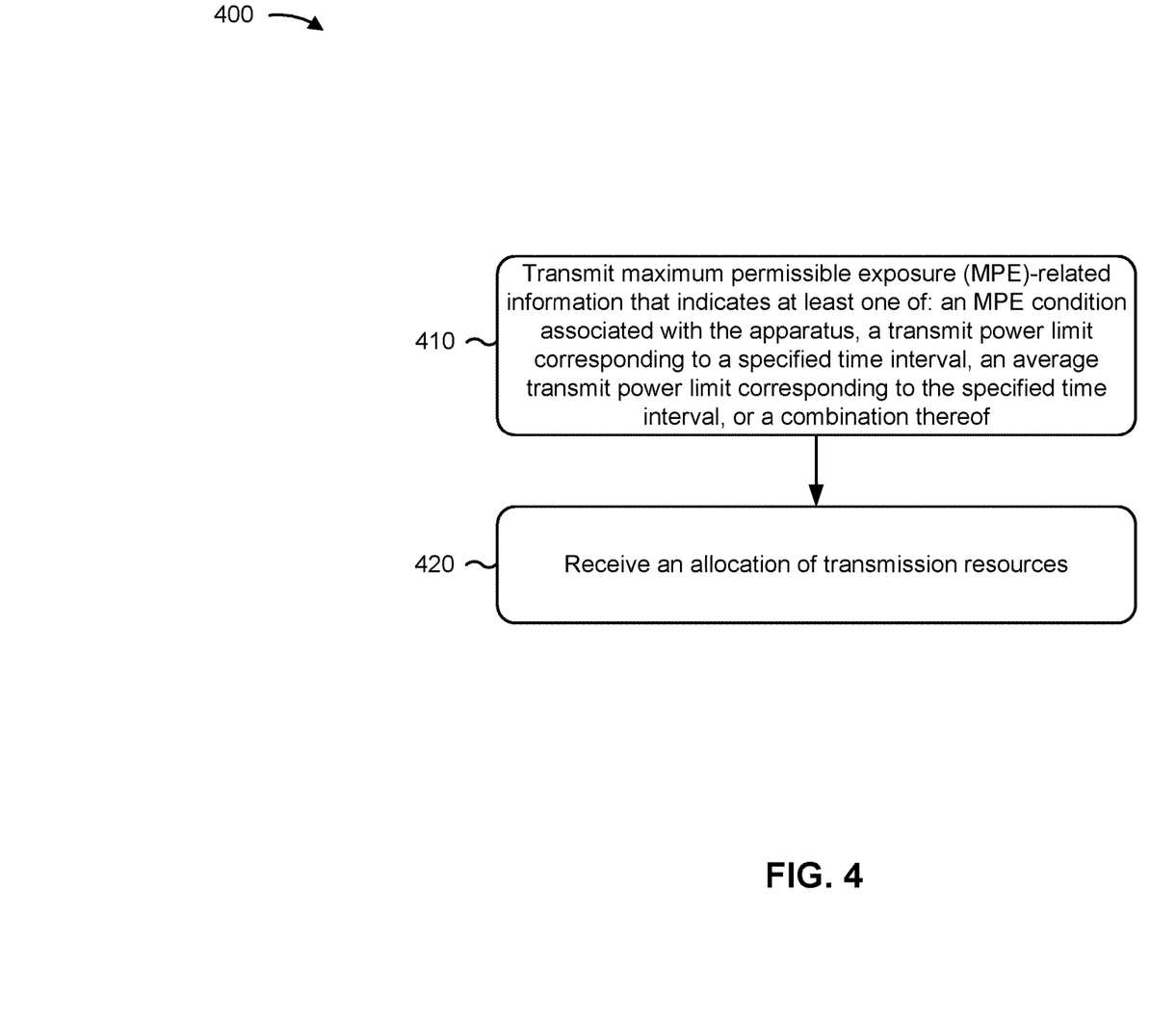
FIG. 4 is a diagram illustrating an example process performed, for example, by a user equipment, in accordance with various aspects of the present disclosure.

FIG. 4 is a diagram illustrating an example process 400 performed, for example, by a UE, in accordance with various aspects of the present disclosure. Example process 400 is an example where the UE (e.g., UE 120 and/or the like) performs operations associated with MPE-aware transmission scheduling.

As shown in FIG. 4, in some aspects, process 400 may include transmitting MPE-related information that indicates at least one of: an MPE condition associated with the UE, a transmit power limit corresponding to a specified time interval, an average transmit power limit corresponding to the specified time interval, or a combination thereof (block 410). For example, the UE (e.g., using transmit processor 264, controller/processor 280, memory 282, and/or the like) may transmit MPE-related information that indicates at least one of: an MPE condition associated with the UE, a transmit power limit corresponding to a specified time interval, an average transmit power limit corresponding to the specified time interval, or a combination thereof, as described above.

As further shown in FIG. 4, in some aspects, process 400 may include receiving an allocation of transmission resources (block 420). For example, the UE (e.g., using receive processor 258, controller/processor 280, memory 282, and/or the like) may receive an allocation of transmission resources, as described above.

Process 400 may include additional aspects, such as any single aspect or any combination of aspects described below and/or in connection with one or more other processes described elsewhere herein.

In a first aspect, the MPE-related information is transmitted using a MAC-CE.

In a second aspect, alone or in combination with the first aspect, the MPE-related information is transmitted using a PUCCH.

In a third aspect, alone or in combination with one or more of the first and second aspects, the MPE-related information is transmitted using UCI on a PUSCH.

In a fourth aspect, alone or in combination with one or more of the first through third aspects, the MPE-related information is transmitted in a PHR.

In a fifth aspect, alone or in combination with one or more of the first through fourth aspects, process 400 includes receiving, from a BS, a configuration corresponding to the MPE-related information.

In a sixth aspect, alone or in combination with one or more of the first through fifth aspects, the configuration comprises at least one of: a parameter configuration specifying the MPE-related information, a resource allocation for transmitting the MPE-related information, trigger information associated with transmitting the MPE-related information, or a combination thereof.

In a seventh aspect, alone or in combination with one or more of the first through sixth aspects, the trigger information indicates a trigger for transmitting the MPE-related information, the trigger comprising at least one of a dynamic signaling message from a base station, a specified event detected by the UE, or a combination thereof.

In an eighth aspect, alone or in combination with one or more of the first through seventh aspects, the configuration is carried in an RRC message.

In a ninth aspect, alone or in combination with one or more of the first through eighth aspects, the configuration is carried in DCI.

In a tenth aspect, alone or in combination with one or more of the first through ninth aspects, transmitting the MPE-related information comprises transmitting the MPE-related information to a BS.

In an eleventh aspect, alone or in combination with one or more of the first through tenth aspects, the allocation of transmission resources is received from the BS and includes an allocation of uplink resources.

In a twelfth aspect, alone or in combination with one or more of the first through eleventh aspects, transmitting the MPE-related information comprises transmitting the MPE-related information to another UE.

In a thirteenth aspect, alone or in combination with one or more of the first through twelfth aspects, the allocation of transmission resources is received from the other UE and includes an allocation of sidelink resources.

In a fourteenth aspect, alone or in combination with one or more of the first through thirteenth aspects, the allocation of transmission resources indicates at least one of: a set of transmission parameters, a transmit power corresponding to a transmit time interval, a duration of the transmit time interval, or a combination thereof.

In a fifteenth aspect, alone or in combination with one or more of the first through fourteenth aspects, the set of transmission parameters indicates at least one of: an MCS, a set of time resources, a set of frequency resources, or a combination thereof.

In a sixteenth aspect, alone or in combination with one or more of the first through fifteenth aspects, the allocation of transmission resources is based at least in part on the MPE-related information.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
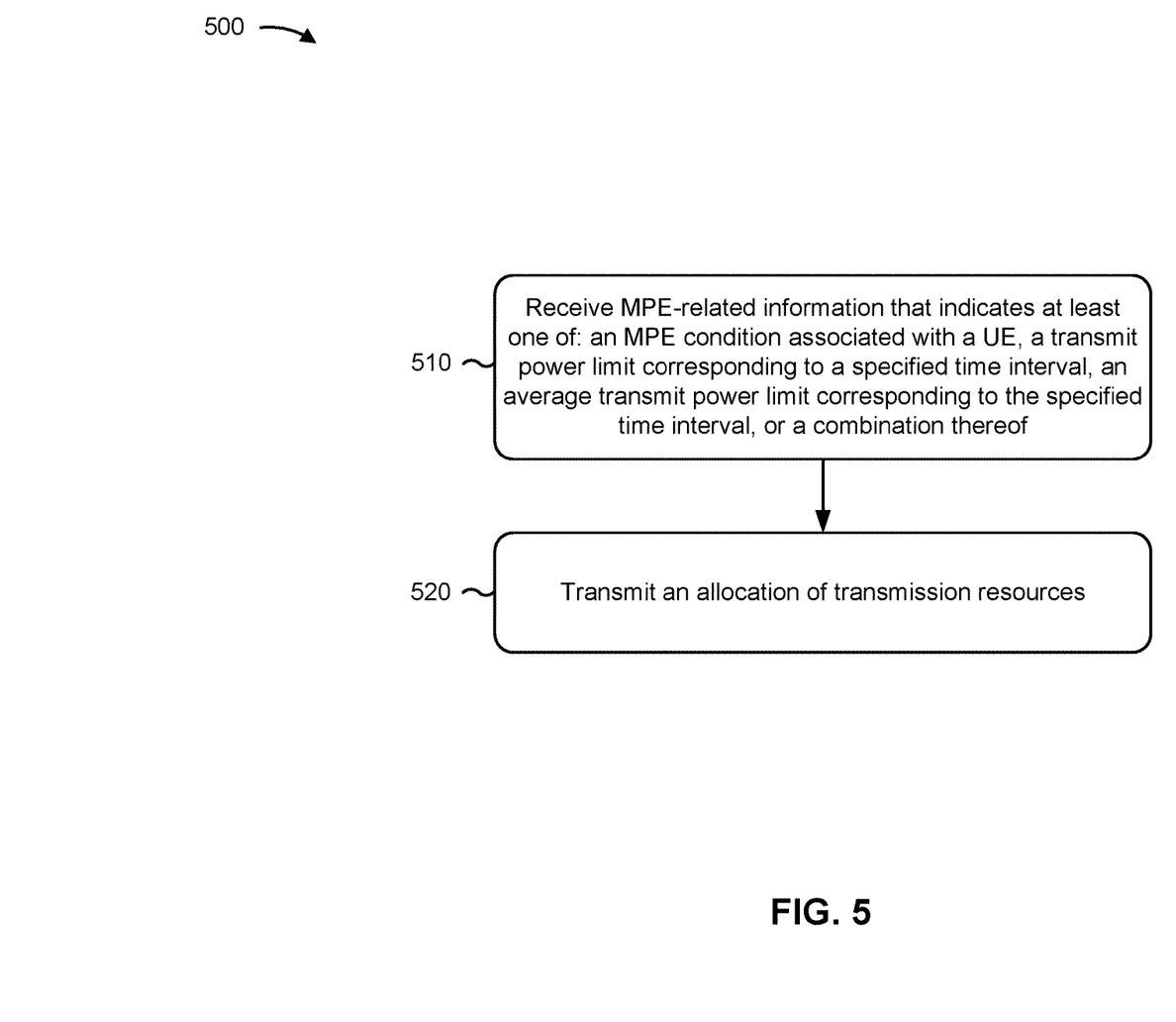
FIG. 5 is a diagram illustrating an example process performed, for example, by a base station, in accordance with various aspects of the present disclosure.

FIG. 5 is a diagram illustrating an example process 500 performed, for example, by a BS, in accordance with various aspects of the present disclosure. Example process 500 is an example where the BS (e.g., BS 110 and/or the like) performs operations associated with MPE-aware transmission scheduling.

As shown in FIG. 5, in some aspects, process 500 may include receiving MPE-related information that indicates at least one of: an MPE condition associated with a UE, a transmit power limit corresponding to a specified time interval, an average transmit power limit corresponding to the specified time interval, or a combination thereof (block 510). For example, the BS (e.g., using receive processor 238, controller/processor 240, memory 242, and/or the like) may receive MPE-related information that indicates at least one of: an MPE condition associated with a UE, a transmit power limit corresponding to a specified time interval, an average transmit power limit corresponding to the specified time interval, or a combination thereof, as described above.

As further shown in FIG. 5, in some aspects, process 500 may include transmitting an allocation of transmission resources (block 520). For example, the BS (e.g., using transmit processor 220, controller/processor 240, memory 242, and/or the like) may transmit an allocation of transmission resources, as described above.

Process 500 may include additional aspects, such as any single aspect or any combination of aspects described below and/or in connection with one or more other processes described elsewhere herein.

In a first aspect, the MPE-related information is transmitted using a MAC-CE.

In a second aspect, alone or in combination with the first aspect, the MPE-related information is transmitted using a PUCCH.

In a third aspect, alone or in combination with one or more of the first and second aspects, the MPE-related information is transmitted using UCI on a PUSCH.

In a fourth aspect, alone or in combination with one or more of the first through third aspects, the MPE-related information is transmitted in a PHR.

In a fifth aspect, alone or in combination with one or more of the first through fourth aspects, process 500 includes transmitting, to the UE, a configuration corresponding to the MPE-related information.

In a sixth aspect, alone or in combination with one or more of the first through fifth aspects, the configuration comprises at least one of: a parameter configuration specifying the MPE-related information, a resource allocation for transmitting the MPE-related information, trigger information associated with transmitting the MPE-related information, or a combination thereof.

In a seventh aspect, alone or in combination with one or more of the first through sixth aspects, the trigger information indicates a trigger for transmitting the MPE-related information, the trigger comprising at least one of a dynamic signaling message from a base station, a specified event detected by the UE, or a combination thereof.

In an eighth aspect, alone or in combination with one or more of the first through seventh aspects, the configuration is carried in an RRC message.

In a ninth aspect, alone or in combination with one or more of the first through eighth aspects, the configuration is carried in DCI.

In a tenth aspect, alone or in combination with one or more of the first through ninth aspects, the allocation of transmission resources includes an allocation of uplink resources.

In an eleventh aspect, alone or in combination with one or more of the first through tenth aspects, the allocation of transmission resources indicates at least one of: a set of transmission parameters, a transmit power corresponding to a transmit time interval, a duration of the transmit time interval, or a combination thereof.

In a twelfth aspect, alone or in combination with one or more of the first through eleventh aspects, the set of transmission parameters indicates at least one of: an MCS, a set of time resources, a set of frequency resources, or a combination thereof.

In a thirteenth aspect, alone or in combination with one or more of the first through twelfth aspects, the allocation of transmission resources is based at least in part on the MPE-related information.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
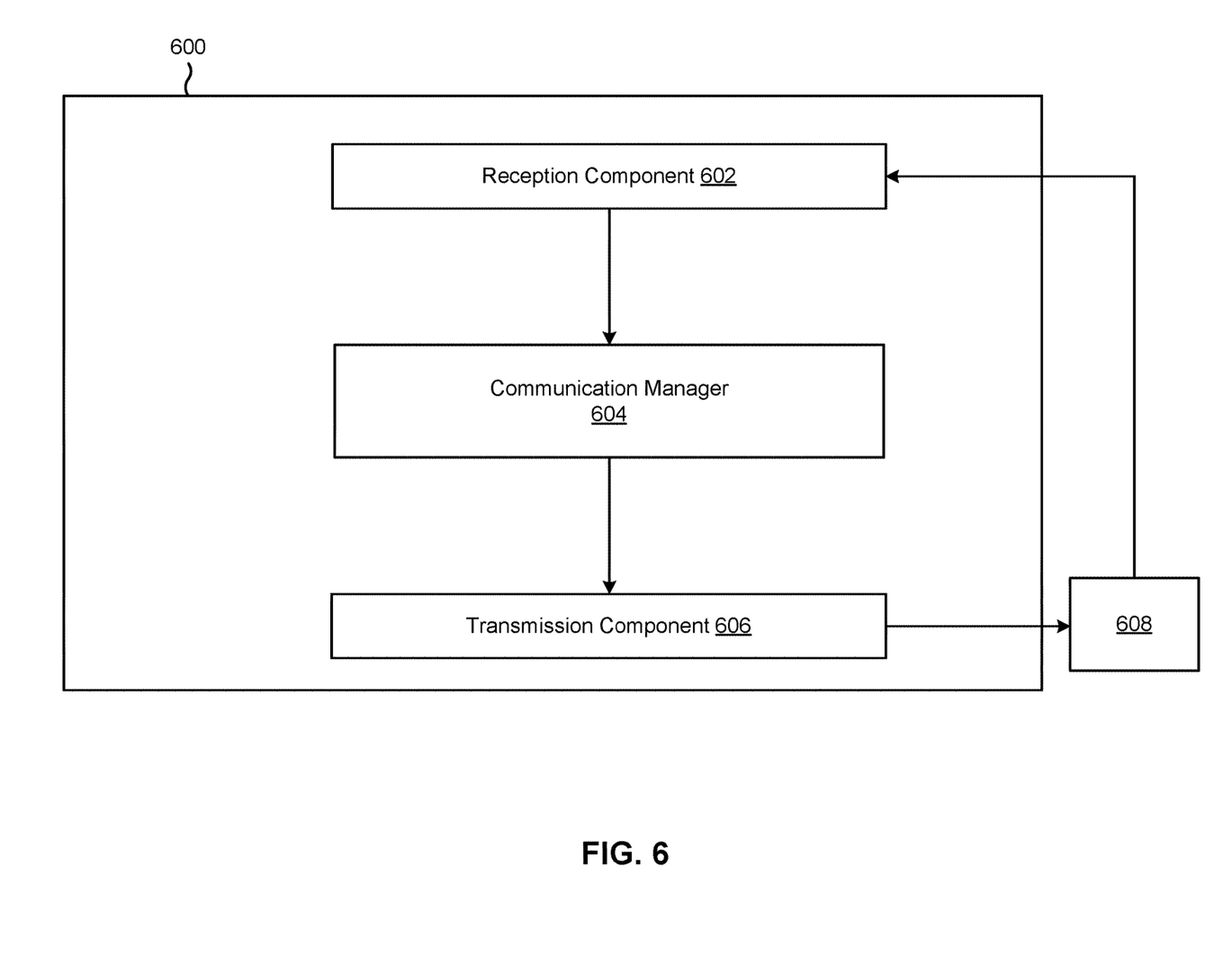
FIGS. 6 and 7 are block diagrams of example apparatuses for wireless communication, in accordance with the present disclosure.

FIG. 6 is a block diagram of an example apparatus 600 for wireless communication. The apparatus 600 may be a UE, or a UE may include the apparatus 600. In some aspects, the apparatus 600 includes a reception component 602, a communication manager 604, and a transmission component 606, which may be in communication with one another (for example, via one or more buses). As shown, the apparatus 600 may communicate with another apparatus 608 (such as a UE, a base station, or another wireless communication device) using the reception component 602 and the transmission component 606.

In some aspects, the apparatus 600 may be configured to perform one or more operations described herein in connection with FIGS. 3-5. Additionally or alternatively, the apparatus 600 may be configured to perform one or more processes described herein, such as process 400 of FIG. 4. In some aspects, the apparatus 600 may include one or more components of the UE described above in connection with FIG. 2.

The reception component 602 may receive communications, such as reference signals, control information, data communications, or a combination thereof, from the apparatus 608. The reception component 602 may provide received communications to one or more other components of the apparatus 600, such as the communication manager 604. In some aspects, the reception component 602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 602 may include one or more antennas, a demodulator, a MIMO detector, a receive processor, a controller/processor, a memory, or a combination thereof, of the UE described above in connection with FIG. 2.

The transmission component 606 may transmit communications, such as reference signals, control information, data communications, or a combination thereof, to the apparatus 608. In some aspects, the communication manager 604 may generate communications and may transmit the generated communications to the transmission component 606 for transmission to the apparatus 608. In some aspects, the transmission component 606 may perform signal processing on the generated communications (such as filtering, amplification, modulation, digital-to-analog conversion, multiplexing, interleaving, mapping, or encoding, among other examples), and may transmit the processed signals to the apparatus 608. In some aspects, the transmission component 606 may include one or more antennas, a modulator, a transmit MIMO processor, a transmit processor, a controller/processor, a memory, or a combination thereof, of the UE described above in connection with FIG. 2. In some aspects, the transmission component 606 may be co-located with the reception component 602 in a transceiver.

The communication manager 604 may cause the transmission component 606 to transmit MPE-related information that indicates at least one of: an MPE condition associated with the UE, a transmit power limit corresponding to a specified time interval, an average transmit power limit corresponding to the specified time interval, or a combination thereof. The communication manager 604 may cause the reception component 602 to receive an allocation of transmission resources. In some aspects, the communication manager 604 may include a controller/processor, a memory, or a combination thereof, of the UE described above in connection with FIG. 2.

Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally or alternatively, a set of (one or more) components shown in FIG. 6 may perform one or more functions described as being performed by another set of components shown in FIG. 6.

Figure 7:
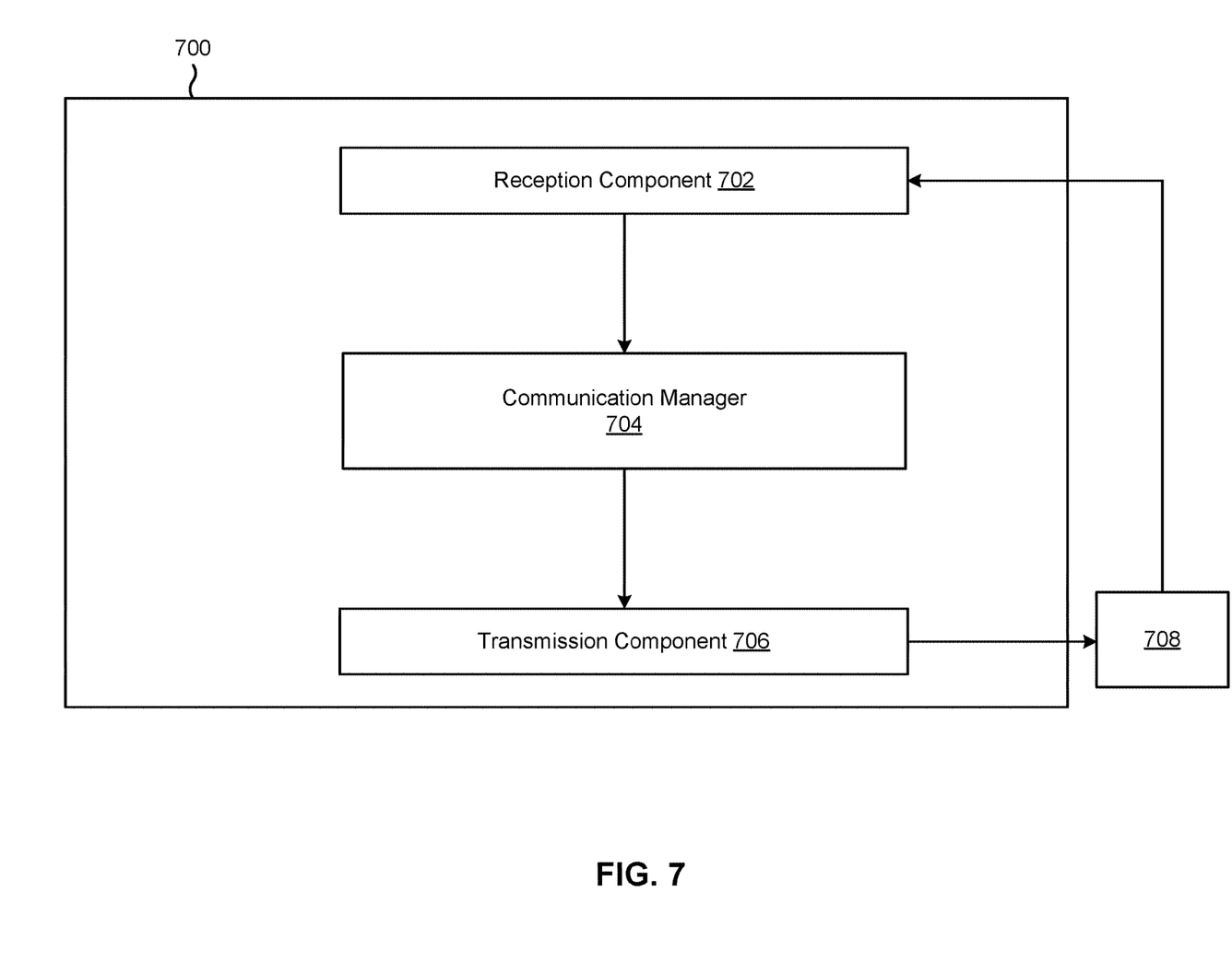

FIG. 7 is a block diagram of an example apparatus 700 for wireless communication. The apparatus 700 may be a base station, or a base station may include the apparatus 700. In some aspects, the apparatus 700 includes a reception component 702, a communication manager 704, and a transmission component 706, which may be in communication with one another (for example, via one or more buses). As shown, the apparatus 700 may communicate with another apparatus 708 (such as a UE, a base station, or another wireless communication device) using the reception component 702 and the transmission component 706.

In some aspects, the apparatus 700 may be configured to perform one or more operations described herein in connection with FIGS. 3-5. Additionally or alternatively, the apparatus 700 may be configured to perform one or more processes described herein, such as process 500 of FIG. 5. In some aspects, the apparatus 700 may include one or more components of the base station described above in connection with FIG. 2.

The reception component 702 may receive communications, such as reference signals, control information, data communications, or a combination thereof, from the apparatus 708. The reception component 702 may provide received communications to one or more other components of the apparatus 700, such as the communication manager 704. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 702 may include one or more antennas, a demodulator, a MIMO detector, a receive processor, a controller/processor, a memory, or a combination thereof, of the base station described above in connection with FIG. 2.

The transmission component 706 may transmit communications, such as reference signals, control information, data communications, or a combination thereof, to the apparatus 708. In some aspects, the communication manager 704 may generate communications and may transmit the generated communications to the transmission component 706 for transmission to the apparatus 708. In some aspects, the transmission component 706 may perform signal processing on the generated communications (such as filtering, amplification, modulation, digital-to-analog conversion, multiplexing, interleaving, mapping, or encoding, among other examples), and may transmit the processed signals to the apparatus 708. In some aspects, the transmission component 706 may include one or more antennas, a modulator, a transmit MIMO processor, a transmit processor, a controller/processor, a memory, or a combination thereof, of the base station described above in connection with FIG. 2. In some aspects, the transmission component 706 may be co-located with the reception component 702 in a transceiver.

The communication manager 704 may cause the reception component 702 to receive MPE-related information that indicates at least one of: an MPE condition associated with a UE, a transmit power limit corresponding to a specified time interval, an average transmit power limit corresponding to the specified time interval, or a combination thereof. The communication manager 704 may cause the transmission component 706 to transmit an allocation of transmission resources. In some aspects, the communication manager 704 may include a controller/processor, a memory, a scheduler, a communication unit, or a combination thereof, of the base station described above in connection with FIG. 2.

Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally or alternatively, a set of (one or more) components shown in FIG. 7 may perform one or more functions described as being performed by another set of components shown in FIG. 7.

The following provides an overview of aspects of the present disclosure:

Aspect 1: A method of wireless communication performed by a UE, comprising: transmitting maximum permissible exposure (MPE)-related information that indicates at least one of: an MPE condition associated with the UE, a transmit power limit corresponding to a specified time interval, an average transmit power limit corresponding to the specified time interval, or a combination thereof; and receiving an allocation of transmission resources.

Aspect 2: The method of aspect 1, wherein the MPE-related information is transmitted using a medium access control (MAC) control element.

Aspect 3: The method of aspect 1, wherein the MPE-related information is transmitted using a physical uplink control channel.

Aspect 4: The method of either of aspects 1 or 2, wherein the MPE-related information is transmitted using uplink control information on a physical uplink shared channel.

Aspect 5: The method of any of aspects 1, 2, or 4, wherein the MPE-related information is transmitted in a power headroom report.

Aspect 6: The method of any of aspects 1-5, further comprising receiving, from a base station, a configuration corresponding to the MPE-related information.

Aspect 7: The method of aspect 6, wherein the configuration comprises at least one of: a parameter configuration specifying the MPE-related information, a resource allocation for transmitting the MPE-related information, trigger information associated with transmitting the MPE-related information, or a combination thereof.

Aspect 8: The method of aspect 7, wherein the trigger information indicates a trigger for transmitting the MPE-related information, the trigger comprising at least one of a dynamic signaling message from a base station, a specified event detected by the UE, or a combination thereof.

Aspect 9: The method of any of aspects 6-8, wherein the configuration is carried in a radio resource control message.

Aspect 10: The method of any of aspects 6-8, wherein the configuration is carried in downlink control information.

Aspect 11: The method of any of aspects 1-10, wherein transmitting the MPE-related information comprises transmitting the MPE-related information to a base station.

Aspect 12: The method of aspect 11, wherein the allocation of transmission resources is received from the base station and includes an allocation of uplink resources.

Aspect 13: The method of any of aspects 1-10, wherein transmitting the MPE-related information comprises transmitting the MPE-related information to another UE.

Aspect 14: The method of aspect 13, wherein the allocation of transmission resources is received from the other UE and includes an allocation of sidelink resources.

Aspect 15: The method of any of aspects 1-14, wherein the allocation of transmission resources indicates at least one of: a set of transmission parameters, a transmit power corresponding to a transmit time interval, a duration of the transmit time interval, or a combination thereof.

Aspect 16: The method of aspect 15, wherein the set of transmission parameters indicates at least one of: a modulation and coding scheme (MCS), a set of time resources, a set of frequency resources, or a combination thereof.

Aspect 17: The method of any of aspects 1-16, wherein the allocation of transmission resources is based at least in part on the MPE-related information.

Aspect 18: A method of wireless communication performed by a base station (BS), comprising: receiving maximum permissible exposure (MPE)-related information that indicates at least one of: an MPE condition associated with a user equipment (UE), a transmit power limit corresponding to a specified time interval, an average transmit power limit corresponding to the specified time interval, or a combination thereof; and transmitting an allocation of transmission resources.

Aspect 19: The method of aspect 18, wherein the MPE-related information is transmitted using a medium access control (MAC) control element.

Aspect 20: The method of aspect 18, wherein the MPE-related information is transmitted using a physical uplink control channel.

Aspect 21: The method of either of aspects 18 or 19, wherein the MPE-related information is transmitted using uplink control information on a physical uplink shared channel.

Aspect 22: The method of any of aspects 18, 19, or 21, wherein the MPE-related information is transmitted in a power headroom report.

Aspect 23: The method of any of aspects 18-22, further comprising transmitting, to the UE, a configuration corresponding to the MPE-related information.

Aspect 24: The method of aspect 23, wherein the configuration comprises at least one of: a parameter configuration specifying the MPE-related information, a resource allocation for transmitting the MPE-related information, trigger information associated with transmitting the MPE-related information, or a combination thereof.

Aspect 25: The method of aspect 24, wherein the trigger information indicates a trigger for transmitting the MPE-related information, the trigger comprising at least one of a dynamic signaling message from a base station, a specified event detected by the UE, or a combination thereof.

Aspect 26: The method of any of aspects 23-25, wherein the configuration is carried in a radio resource control message.

Aspect 27: The method of any of aspects 23-25, wherein the configuration is carried in downlink control information.

Aspect 28: The method of any of aspects 18-27, wherein the allocation of transmission resources includes an allocation of uplink resources.

Aspect 29: The method of any of aspects 18-28, wherein the allocation of transmission resources indicates at least one of: a set of transmission parameters, a transmit power corresponding to a transmit time interval, a duration of the transmit time interval, or a combination thereof.

Aspect 30: The method of aspect 29, wherein the set of transmission parameters indicates at least one of: a modulation and coding scheme (MCS), a set of time resources, a set of frequency resources, or a combination thereof.

Aspect 31: The method of any of aspects 18-30, wherein the allocation of transmission resources is based at least in part on the MPE-related information.

Aspect 31: An apparatus for wireless communication at a device, comprising a processor; memory coupled with the processor; and instructions stored in the memory and executable by the processor to cause the apparatus to perform the method of one or more aspects of aspects 1-30.

Aspect 32: A device for wireless communication, comprising a memory and one or more processors coupled to the memory, the memory and the one or more processors configured to perform the method of one or more aspects of aspects 1-30.

Aspect 33: An apparatus for wireless communication, comprising at least one means for performing the method of one or more aspects of aspects 1-30.

Aspect 34: A non-transitory computer-readable medium storing code for wireless communication, the code comprising instructions executable by a processor to perform the method of one or more aspects of aspects 1-30.

Aspect 35: A non-transitory computer-readable medium storing a set of instructions for wireless communication, the set of instructions comprising one or more instructions that, when executed by one or more processors of a device, cause the device to perform the method of one or more aspects of aspects 1-30.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
receiving a parameter configuration comprising trigger information,
wherein the trigger information indicates a trigger for transmitting at least one of:
a transmit power limit corresponding to a specified time interval associated with a maximum permissible exposure (MPE) limit,
an average transmit power limit corresponding to the specified time interval, or
a combination thereof, and
wherein the trigger comprises a specified event detected by the UE;
transmitting MPE-related information that indicates at least one of:
the transmit power limit,
the average transmit power limit, or
the combination thereof; and
receiving an allocation of transmission resources associated with the specified time interval over which the MPE limit is to be satisfied in accordance with the transmit power limit, the average transmit power limit, or the combination thereof.

2. The method of claim 1, wherein the MPE-related information includes an MPE condition associated with the UE.

3. The method of claim 2, wherein at least one of the transmit power limit or the average transmit power limit is based at least in part upon the MPE condition.

4. The method of claim 1, wherein the MPE-related information is transmitted using a medium access control (MAC) control element.

5. The method of claim 1, wherein the MPE-related information is transmitted in a power headroom report.

6. The method of claim 1, wherein the trigger further comprises a dynamic signaling message from a base station.

7. The method of claim 1, wherein transmitting the MPE-related information comprises transmitting the MPE-related information to another UE.

8. The method of claim 7, wherein the allocation of transmission resources is received from the other UE and includes an allocation of sidelink resources.

9. The method of claim 1, wherein the allocation of transmission resources indicates at least one of:
a set of transmission parameters,
a transmit power corresponding to a transmit time interval,
a duration of the transmit time interval, or
a combination thereof.

10. The method of claim 9, wherein the set of transmission parameters indicates at least one of:
a modulation and coding scheme (MCS),
a set of time resources,
a set of frequency resources, or
a combination thereof.

11. The method of claim 1, wherein the MPE-related information is transmitted using a physical uplink control channel (PUCCH) or uplink control information (UCI) on a physical uplink shared channel (PUSCH).

12. A method of wireless communication performed by a base station (BS), comprising:
transmitting, to a user equipment (UE), a parameter configuration comprising trigger information,
wherein the trigger information indicates a trigger for transmitting at least one of:
a transmit power limit corresponding to a specified time interval associated with a maximum permissible exposure (MPE) limit,
an average transmit power limit corresponding to the specified time interval, or
a combination thereof, and
wherein the trigger comprises a specified event detected by the UE;
receiving, from the UE, MPE-related information that indicates at least one of:
the transmit power limit,
the average transmit power limit, or
the combination thereof; and
transmitting an allocation of transmission resources associated with the specified time interval.

13. The method of claim 12, wherein the MPE-related information includes an MPE condition associated with the UE.

14. The method of claim 13, wherein at least one of the transmit power limit or the average transmit power limit is based at least in part upon the MPE condition.

15. The method of claim 12, wherein the MPE-related information is transmitted using a medium access control (MAC) control element.

16. The method of claim 12, wherein the MPE-related information is transmitted in a power headroom report.

17. The method of claim 2, wherein the trigger further comprises a dynamic signaling message to the UE.

18. The method of claim 12, wherein the allocation of transmission resources includes an allocation of uplink resources.

19. The method of claim 12, wherein the allocation of transmission resources indicates at least one of:
a set of transmission parameters,
a transmit power corresponding to a transmit time interval,
a duration of the transmit time interval, or
a combination thereof.

20. The method of claim 19, wherein the set of transmission parameters indicates at least one of:
a modulation and coding scheme (MCS),
a set of time resources,
a set of frequency resources, or
a combination thereof.

21. The method of claim 12, wherein the allocation of transmission resources is based at least in part on the MPE-related information.

22. A user equipment (UE) for wireless communication, comprising:
one or more memories; and
one or more processors coupled to the one or more memories, the one or more processors configured to:
receive a parameter configuration comprising trigger information,
wherein the trigger information indicates a trigger for transmitting at least one of:

a transmit power limit corresponding to a specified time interval associated with a maximum permissible exposure (MPE) limit,
an average transmit power limit corresponding to the specified time interval, or
a combination thereof, and
wherein the trigger comprises a specified event detected by the UE;
transmit MPE-related information that indicates at least one of:
the transmit power limit,
the average transmit power limit, or
the combination thereof; and
receive an allocation of transmission resources associated with the specified time interval over which the MPE limit is to be satisfied in accordance with the transmit power limit, the average transmit power limit, or the combination thereof.

23. The UE of claim 22, wherein the MPE-related information includes an MPE condition associated with the UE.

24. The UE of claim 23, wherein at least one of the transmit power limit or the average transmit power limit is based at least in part upon the MPE condition.

25. The UE of claim 22, wherein the MPE-related information is transmitted using a physical uplink control channel (PUCCH) or uplink control information (UCI) on a physical uplink shared channel (PUSCH).

26. The UE of claim 22, wherein the trigger further comprises a dynamic signaling message from a base station.

27. The UE of claim 22, wherein transmitting the MPE-related information comprises transmitting the MPE-related information to another UE.

28. A base station (BS) for wireless communication, comprising:
one or more memories; and
one or more processors coupled to the one or more memories, the one or more processors configured to:
transmit, to a user equipment (UE), a parameter configuration comprising trigger information,
wherein the trigger information indicates a trigger for transmitting at least one of:
a transmit power limit corresponding to a specified time interval associated with a maximum permissible exposure (MPE) limit,
an average transmit power limit corresponding to the specified time interval, or
a combination thereof, and
wherein the trigger comprises a specified event detected by the UE;
receive, from the UE, MPE-related information that indicates at least one of:
the transmit power limit,
the average transmit power limit, or
the combination thereof; and
transmit an allocation of transmission resources associated with the specified time interval.

29. The base station of claim 28, wherein the MPE-related information includes an MPE condition associated with the UE.

30. The base station of claim 28, wherein at least one of the transmit power limit or the average transmit power limit is based at least in part upon the MPE condition.

* * * * *